United States Patent [19]
Phillippe

[11] 3,779,611
[45] Dec. 18, 1973

[54] LIGHT WEIGHT RACING WHEEL

[75] Inventor: Maurice Phillippe, Hethersett, Norfolk, England

[73] Assignee: Vel's Ford Sales Co., Torrance, Calif.

[22] Filed: Apr. 12, 1972

[21] Appl. No.: 243,232

[52] U.S. Cl. .......... 301/65, 152/10, 301/79
[51] Int. Cl. ........ B60b 9/26, B60b 1/08, B60b 1/12
[58] Field of Search .............. 301/65, 64 SH, 79, 301/63 PW; 152/8, 9, 10, 6, 7

[56] References Cited
UNITED STATES PATENTS

| 3,656,531 | 4/1972 | Ross | 301/63 PW |
| 1,558,656 | 10/1925 | Waterbor | 301/65 |
| 1,506,098 | 8/1924 | Wade | 301/65 |
| 3,253,862 | 5/1966 | Watanabe | 301/65 |

Primary Examiner—Richard J. Johnson
Attorney—Gerald Singer

[57] ABSTRACT

A wheel having spoke members connecting the hub portion with the rim portion that are hollow and connect with the hub portion in a sealing relationship. The opposite ends of each of the hollow spoke members thereby exposing the inside of each of the spokes. A hole is located in one of the spokes near the hub for inflating a tire mounted on the rim portion.

6 Claims, 4 Drawing Figures

PATENTED DEC 18 1973 3,779,611

LIGHT WEIGHT RACING WHEEL

This invention relates to a high speed racing wheel and more particularly to a hollow spoked wheel of improved design.

In an effort to improve the performance of the modern high speed vehicle and more particularly the racing car, it is desirable to make the wheel as light as possible. The modern racing wheel has therefore been constructed of such materials as aluminum or magnesium in an effort to decrease the weight of the wheel to thereby increase the sprung to unsprung ratio of the vehicle to the wheel.

Unfortunately, simply making the wheel lighter according to present designs has resulted in wheels that have become unstable and unsafe due to the lack of ridigity and stiffness in the wheel structure.

It is well known that the wheel or any vehicle must transmit the acceleration torque from the engine to the tire located on the rim of the wheels. The spokes connecting the rim with the hub portion of the wheel must be strong and stiff in the proper direction to withstand any bending caused by the application of torque at the hub of the wheel. Deceleration or braking of the vehicle also produces a bending of the spoke members and in the same plane as the application of the accelerating torque. The bending moment however is in the opposite direction since the tire located on the rim of the wheel is applying a decelerating torque to the hub portion of the wheel through the supporting spoke members.

Orthogonal bending forces are also generated across the spokes connecting the hub portion with the rim portion when the vehicle is in a cornering mode or in a turning operation. Cornering of the vehicle generates side forces on the wheel that tends to bend the wheel around a diameter through the hub member.

The spoke members must therefore be rigid and stable with a high moment of inertia in orthogonal directions to resist the bending forces generated by the cornering of the vehicle and the bending forces generated by the application of acceleration and deceleration forces.

Unfortunately, simply making the spoke members thicker in both directions to resist the orthogonal bending forces created additional problems due to the high rate of expansion of the aluminum and magnesium of which the wheels are presently being constructed. As is well known in the casting art, connecting a thick walled member with a relatively thin walled member creates cooling problems and interdendritic porosity problems due to the large volume change in the metal from the molten state to the solid state. These porosity problems exist whether the wheel is being cast by means of the conventional sand casting techniques or by injected molding techniques. The cooling process causes a very large change in the volume of the metal. In the area connecting a thin walled section with a relatively thick walled section, the outside portion cools first and contracts, leaving the inside portion which is still warm in an expanded state to draw away from the outside section thereby causing holes and areas of porosity generally identified as interdendritic porosity. These openings or holes have the effect of making the structure weak since the density of the metal is not constant but changes throughout the cross sectional area of the wheel.

The hub must of necessity have a thickness sufficient to transmit the torque of the engine when it is accelerating and to also transmit the torque of the engine when it is accelerating and to also transmit the decelerating torque when the car is being braked. In addition, the hub must have the necessary thickness to support the bending forces generated when the car is drifting through a turn. Hence, the thickness of the hub is usually determined by external forces on the wheel and as a result, a certain thickness of magnesium or aluminum is necessary to withstand the forces generated.

In view of the present day trend towards tires having a wide tread which may vary from a tread of 10 inches from bead to bead to a tread of 20 inches bead to bead it is recognized that the rim of the wheel supporting the tire represents a substantially large cross sectional area of metal since the average diameter of the wheel may vary from approximately 12 to 16 inches. In order to reduce the weight of the wheel to a minimum it is necessary therefore that the thickness of the rim be made as thin as possible consistent with the loads transmitted by the tires to the hub portion. Connecting relatively the thin rim to the thick spoke members causes the porosity problems mentioned above.

In accordance with the present invention, four orthogonally located hollow spoke members are used to interconnect the hub portion with the rim portion of the wheel. Each spoke is connected to the hub in a sealed relationship. A suitable fillet is used at each juncture between the radiating hollow spoke members and the hub portion. The walled thickness of the spoke is chosen so that the thickness of the spoke members plus the thickness of the fillets together approximate the thickness of the hub member at the point of connection. In this fashion the interdendritic porosity problems are minimized at the junction of the individual spoke members to the hub members.

In the preferred embodiment, the spoke members are tapered radially to the rim portion where each of the spoke members terminates in an open annulus on the face of the rim member. Due to the open annulus there is no need for fillets or other devices which increase the thickness of the attaching walled members of the spokes to the walled thickness of the rim. As a result of this construction, the thickness of the wallled spoke members terminating in the rim member is substantially the same thickness as the rim member and hence, the interdendritic porosity problems in this area are also substantially eliminated.

The tire is mounted on the rim member in the conventional manner. A valve stem for inserting air into the tire is located in one of the spokes near the hub member since each of the spokes is hollow and communicates through the annular opening with the internal pressure located within the tire. Locating the stem in one of the spoke members close to the hub portion of the wheel reduces the unbalancing effect caused by the stem to a minimum. In the usual situation the stem causes an unbalanced situation since it is located on the rim member at a maximum distance from the hub member.

The external shape of the hollow spoke members approximates a truncated triangle whereas the internal shape of the hollow spoke is more closely identified as an equalateral triangle. The triangle shaped walled spoke members provide the necessary stability, strength, and stiffness in all directions. The spoke terminates in the rim as a triangle which has the maximum stiffness for a given shape.

Further objects and advantages of the present invention will be made more apparent by referring now to the accompanying drawings wherein.

Figure 1:
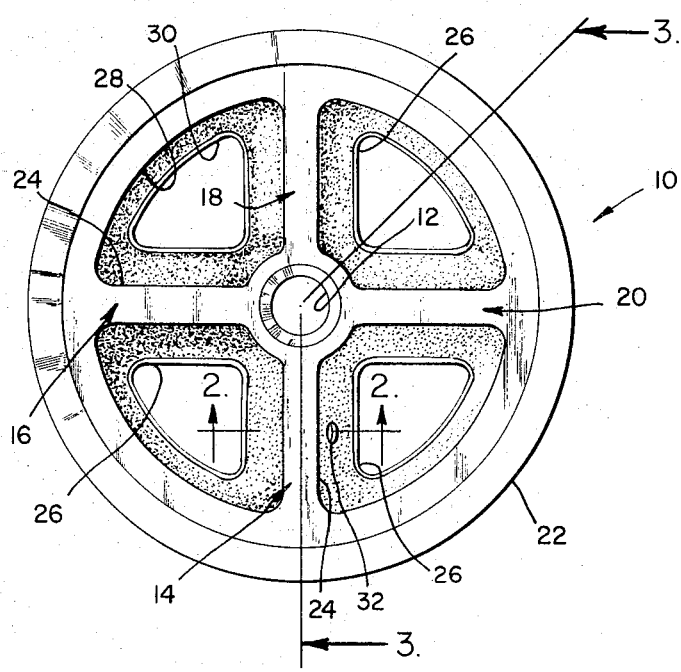
FIG. 1 is a side view of the wheel constructed according to the principles of the present invention.

Referring now to FIG. 1 there is shown a wheel 10 constructed according to the principles of the present invention. Located about the central axis is a hub portion 12 that is connected to the axle by means of a single locking nut (not illustrated). Radiating from the hub 12 are four equally spaced hollow spokes 14, 16, 18, and 20. A rim member 22 circular in form and attached to each of the spokes 14, 16, 18, and 20, is adapted to hold a tire in the conventional manner.

The external shape of each of the hollow spokes 14, 16, 18, and 20 approximates a truncated triangle with the truncated or small portion 24 located in the front of the wheel defined as that portion of the wheel that is visible when installed on the car. The base portion 26 of each of the hollow spokes is in the rear of the wheel and is substantially larger than the front portion 24 in the approximate ratio of 3 to 1.

The external triangular shaped spoke has certain inherent advantages since the changing volume of the openings between the spokes changes from a maximum 28 at the front of the wheel to a minimum opening 30 at the rear of the wheel. This changing volume produces a venturi effect that enhances the flow of air through the openings which is most desirable for cooling brakes and other related equipment when the vehicle is in motion. In addition the truncated side 24 on each of the hollow spokes 14, 16 18 and 20 acts as the leading edge of a plane for forcing air through the variable shaped opening between the spokes.

The truncated shaped spokes 14, 16, 18, and 20, also lend themselves to being readily cast in the conventional sand casting technique since the variations in width from the truncated frontal portion 24 to the rear base portion 26 provides a convenient draft angle that is considered so necessary when sand casting.

All the spokes are identical except that one spoke 14 contains an opening 32 for accepting a valve tire stem for applying air to the tire located on the rim of the wheel. All of the spokes 14, 16, 18, and 20 are sealed to the hub member 12 and open to the rim member 22. It can be appreciated therefore that inserting air through a valve stem inserted into the hole 32 will therefore allow the air pressure to communicate with the inside of the tire located upon the rim 22. Bringing the valve stem closer to the hub member 12 reduces any unbalancing tendencies caused by the weight of the valve stem assembly.

Figure 2:
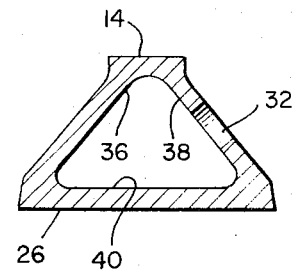
FIG. 2 is a cross section along lines 2—2 of the wheel illustrated in FIG. 1.

Referring now to FIG. 2 there is shown a cross section of spoke 14 along lines 2—2 of FIG. 1 which more fully illustrates the internal dimensions of the hollow spoke 14 as an equalateral triangle having substantially equal interior sides 36, 38 and 40. The triangular shape provides a large moment of inertia about the neutral axis passing perpendicular through the central axis of rotation of the wheel and a high moment of inertia about a neutral axis that is perpendicular to the first neutral axis so as to provide strength to resist bending when the car is cornering as well as when the car is accelerating or decelerating. The triangular shape also provides an additional measure of stiffness since the lower end of each spoke is attached to the hub member 12 in a sealed relationship. In addition the rim end of each spoke is terminated in an open annulus having the general shape of a triangle on the face of the rim member 22. The triangular opening on the rim member provides an increased stiffness at the points of attachment between the individual spoke and the rim member itself.

Figure 3:
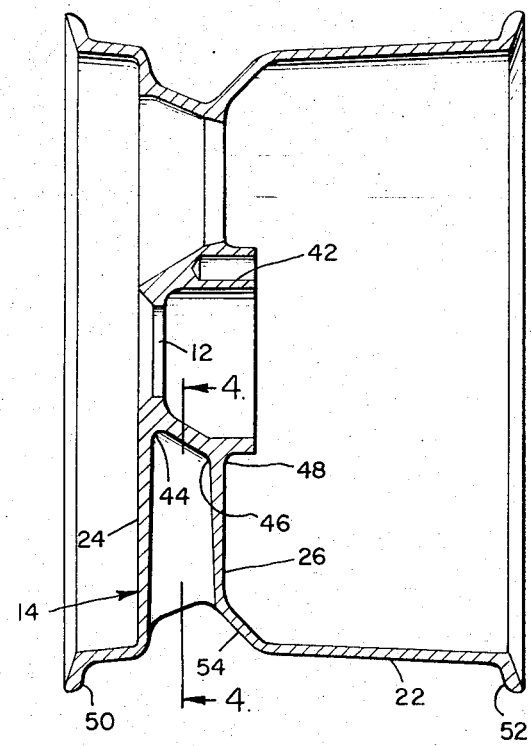
FIG. 3 is a cross section of the wheel illustrated in FIG. 1 along lines 3—3.

Referring now to FIG. 3, there is shown a cross section of the wheel illustrated in FIG. 1 taken along lines 3—3 of FIG. 1. The section lines 3—3 pass through spoke 24 and makes a 45° angle through the opening between spoke 18 and 20 in order to more fully illustrate the hollow spoke 24 and the back of the hub 12 which contains four equally spaced holes 42 for accepting driving lugs connected to the driving flange on the axle of the vehicle.

The cross section of the hollow spoke 18 illustrates the forward wall 14 and the rear wall 26 and the general tapering of both walls from a maximum at the hub member 12 to a minimum at the rim member 22. The attachment of the front wall 14 to the hub member 12 includes a radius 44 defining a fillet that has the effect of increasing the wall thickness of member 14 that is actually in contact with the hub member 12 to approximately the same thickness as the hub member itself. In other words the walled thickness of outside wall 14 plus the thickness of the fillet at 44 approximates the thickness of the hub member 12 thereby reducing the problems of interdendritic porosity. A review of rear wall 26 will show that an inside fillet 46 and an outside fillet 48 at the point of connecting the wall thickness of the rear wall 16 to the hub member 12. As described in connection with the front wall member 14 the combination of the wall thickness plus the fillet at 46 and the fillet at 48 approximates the thickness of the hub member 12 at the point of connecting the rear wall 26 to the hub member 12 thereby again reducing the interdendritic porosity problems.

The tapering of the front wall member 14 and the rear wall member 26 continues to the point of junction with the rim member 22. This tapering allows a general decrease in width in the front wall member 14 and the rear wall member 26. The actual juncture between the front wall 14 with the rim 22 and the rear wall 26 with the rim 22 takes place with the thickness of the wall members being approximately the same as the thickness of the terminating rim member 22 thereby reducing the problems associated with interdendritic porosity. The tapering of the front wall members 14 and the rear wall member 26 also aids the sand casting manufacturing technique since a natural draft angle is produced by the tapering of the wall members.

The rim member 22 contains a flange 50 at the forward end and a flange 52 at the rear portion in order to properly hold and contain the tire. The rim 22 contains a general circular depression 54 where the individual spokes terminate and connect to the rim. The actual shape and curvature is a function of the load to be carried by the wheel and the need for stress distribution within the wheel itself under the varying loads to be encountered.

Figure 4:
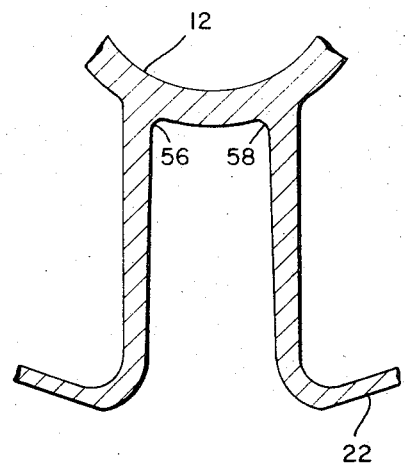
FIG. 4 is a cross section of the wheel illustrated in FIG. 3 along lines 4—4.

Referring now to FIG. 4 there is shown a section taken along lines 4—4 of FIG. 3 which more fully illustrates how the individual spoke is closed at the hub portion 12 and is terminated in an open annulus at the rim member 22. FIG. 4 more fully illustrates how the individual fillets 56 and 58 combine with the thickness of the wall member to thereby provide a thickness of metal that is approximately equal to the thickness of metal of the hub member 12. The terminating of the wall members of the hollow spokes is also more fully shown in the terminating area between the wall members and the rim member 22. It will be noted that since the hollow spoke is opened in the face of the rim member 22 that additional fillets are not needed and hence, the tapered thickness of the wall member of the spokes can be made approximately equal to the thickness of the rim member 22 and in this way substantially eliminate the interdendritic porosity problems associated with prior art devices.

The expanding opening of the hollow spoke to the outside rim area also improves the sand casting technique of manufacture of the defined wheel. Trapped gasses that may have a tendency to accumulate now have an opportunity to be moved and propelled from the restricted opening near the hub 12 to the expanded opening in the area of the rim 22. Any tendency for gasses to be trapped with resulting blow holes is minimized by the natural draft angle of the wall members themselves and the defined opening of each spoke in the rim member.

What is claimed is:
1. A light weight racing wheel comprising:
    a thick walled hub member adapted to be connected to an axle,
    a thinned walled annular rim member adapted to hold a tire, and
    a plurality of hollow spokes having tapered wall members each connected in a sealing relationship to said hub member at one end and terminated in an open annulus on the face of said rim at the other end,
    said tapered wall members having a thick end mating with said thick walled hub members and a thin end mating with said thin walled annular rim members.
2. A wheel according to claim 1 in which the walled thickness of each of said spokes contacting said hub is substantially the same thickness as said hub.
3. A wheel according to claim 1 in which the walled thickness of each of said spokes contacting the rim is substantially the same thickness as said rim.
4. A wheel according to claim 1 which includes four hollow spokes each having an interior triangular shape.
5. A wheel according to claim 1 in which the external shape of each spoke is a truncated triangle of constant outside dimensions in which the smaller end is in front and the larger end is in the rear of the wheel.
6. A wheel according to claim 1 which includes a hole in one of said hollow spokes for accepting a valve stem for inserting air in a tire mounted on the rim.

* * * * *